US009847549B2

United States Patent
Lee et al.

(10) Patent No.: US 9,847,549 B2
(45) Date of Patent: Dec. 19, 2017

(54) ELECTROLYTE AND RECHARGEABLE LITHIUM BATTERY INCLUDING SAME

(71) Applicant: Samsung SDI Co., Ltd., Yongin-si, Gyeonggi-do (KR)

(72) Inventors: Seung-Tae Lee, Yongin-si (KR); Jung-Yi Yu, Yongin-si (KR); Woo-Cheol Shin, Yongin-si (KR); Sang-Il Han, Yongin-si (KR); Sang-Hoon Kim, Yongin-si (KR); Byung-Joo Chung, Yongin-si (KR); Duck-Hyun Kim, Yongin-si (KR); Myung-Hwan Jeong, Yongin-si (KR); Tae-Hyun Bae, Yongin-si (KR); Mi-Hyun Lee, Yongin-si (KR); Eon-Mi Lee, Yongin-si (KR); Ha-Rim Lee, Yongin-si (KR); Moon-Sung Kim, Yongin-si (KR); In-Haeng Cho, Yongin-si (KR); E-Rang Cho, Yongin-si (KR); Dong-Myung Choi, Yongin-si (KR); Vladimir Egorov, Yongin-si (KR); Makhmut Khasanov, Yongin-si (KR); Pavel Alexandrovich Shatunov, Yongin-si (KR); Alexey Tereshchenko, Yongin-si (KR); Denis Chernyshov, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 577 days.

(21) Appl. No.: 14/162,705

(22) Filed: Jan. 23, 2014

(65) Prior Publication Data

US 2014/0242453 A1 Aug. 28, 2014

(30) Foreign Application Priority Data

Feb. 27, 2013 (KR) ........................ 10-2013-0021530

(51) Int. Cl.
*H01M 10/0567* (2010.01)
*C01B 25/26* (2006.01)
(Continued)

(52) U.S. Cl.
CPC ......... *H01M 10/0567* (2013.01); *C01B 25/26* (2013.01); *H01M 10/052* (2013.01);
(Continued)

(58) Field of Classification Search
CPC ......... H01M 10/0569; H01M 10/0568; H01M 10/052; H01M 10/0567; C01B 25/26; Y02E 60/122
(Continued)

(56) References Cited

U.S. PATENT DOCUMENTS 8,119,292 B2 2/2012 Lee et al.
2003/0113635 A1 6/2003 Gan et al.
(Continued)

FOREIGN PATENT DOCUMENTS

JP 2000-36608 A 2/2000
JP 2000-100487 A 4/2000
(Continued)

OTHER PUBLICATIONS

The original Japaenese text of Maeshima in Kogyo Kagaku Zasshi (1959) 62, 1845-9, as cited by STIC search p. 29, in PDF format attached. English translation will be provided in subsequent Office Action.*
(Continued)

*Primary Examiner* — Mark F Huff
*Assistant Examiner* — Omar Kekia
(74) *Attorney, Agent, or Firm* — Lewis Roca Rothgerber Christie LLP

(57) ABSTRACT

An electrolyte for a rechargeable lithium battery including a lithium salt, a non-aqueous organic solvent, and an additive,
(Continued)

wherein the additive includes a compound represented by Chemical Formula 1

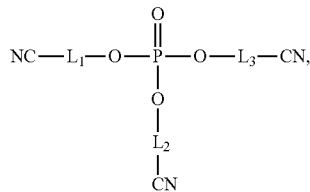

[Chemical Formula 1]

and a rechargeable lithium battery including the same.

17 Claims, 9 Drawing Sheets

(51) Int. Cl.
  *H01M 10/052* (2010.01)
  *H01M 10/0568* (2010.01)
  *H01M 10/0569* (2010.01)
(52) U.S. Cl.
  CPC .... *H01M 10/0568* (2013.01); *H01M 10/0569* (2013.01); *Y02E 60/122* (2013.01)
(58) Field of Classification Search
  USPC .......................................................... 429/188
  See application file for complete search history.

(56) References Cited

U.S. PATENT DOCUMENTS

| | | | |
|---|---|---|---|
| 2004/0142246 A1 | 7/2004 | Han et al. | |
| 2010/0297508 A1 | 11/2010 | Lee et al. | |
| 2011/0052980 A1 | 3/2011 | Sakata et al. | |
| 2011/0159379 A1* | 6/2011 | Matsumoto | H01M 4/0421 429/326 |
| 2011/0229770 A1 | 9/2011 | Yun et al. | |
| 2011/0311865 A1 | 12/2011 | Tatsumi et al. | |
| 2012/0308881 A1* | 12/2012 | Tokuda | H01M 10/0567 429/199 |
| 2013/0224604 A1* | 8/2013 | Yu | H01M 10/052 429/331 |

FOREIGN PATENT DOCUMENTS

| | | |
|---|---|---|
| JP | 2000-348764 A | 12/2000 |
| JP | 2002-198092 A | 7/2002 |
| JP | 2004-221085 A | 8/2004 |
| KR | 10-2007-0031806 A | 3/2007 |
| KR | 10-2011-0014583 A | 2/2011 |
| KR | 10-2011-0053456 | 5/2011 |
| KR | 10-2011-0104391 A | 9/2011 |
| WO | WO 2009/136589 A1 | 11/2009 |
| WO | WO 2010/107034 A1 | 9/2010 |

OTHER PUBLICATIONS

Research on Plasticizers (4th Report) by Toshihisa Maejima in Kogyo Kagaku Zasshi (1959), 62, 1849-52 original Japanese text.*
English translation of Research on Plasticizers (4th Report) by Toshihisa Maejima in Kogyo Kagaku Zasshi (1959), 62, 1849-52.*
Park et al., The important role of additives for improved lithium ion battery safety, Journal of Power Sources vol. 189 (2009), Oct. 2, 2008, pp. 602-606, Elsevier B.V.
KIPO Office Action dated Dec. 14, 2016, for corresponding Korean Patent Application No. 10-2013-0021530 (6 pages).
JPO Office Action dated Nov. 6, 2017, for corresponding Japanese Patent Application No. 2014-032623 (3 pages).

* cited by examiner

ELECTROLYTE AND RECHARGEABLE LITHIUM BATTERY INCLUDING SAME

CROSS-REFERENCE TO RELATED APPLICATION

This application claims priority to and the benefit of Korean Patent Application No. 10-2013-0021530, filed in the Korean Intellectual Property Office on Feb. 27, 2013, the entire content of which is incorporated herein by reference.

BACKGROUND

1. Field

The present disclosure relates to an electrolyte for a rechargeable lithium battery and a rechargeable lithium battery including the same.

2. Description of the Related Art

Batteries transform chemical energy generated from an electrochemical redox reaction of a chemical material in the battery into electrical energy. Such batteries are divided into a primary battery, which should be disposed after all the energy of the primary battery is consumed, and a rechargeable battery, which can be recharged many times. The rechargeable battery can be charged/discharged many times using a reversible conversion between chemical energy and electrical energy.

Recent developments in high-tech electronics have allowed electronic devices to become small and light in weight, which leads to an increase in portable electronic devices. As a power source for such portable electronic devices, demands for batteries with high energy density are increasing and research on rechargeable lithium batteries are underway.

A rechargeable lithium battery is fabricated by injecting an electrolyte into a battery cell, which includes a positive electrode including a positive active material capable of intercalating/deintercalating lithium, and a negative electrode including a negative active material capable of intercalating/deintercalating lithium.

The electrolyte includes an organic solvent in which a lithium salt is dissolved and determines stability and performance of the rechargeable lithium battery. Therefore, an electrolyte additive capable of improving cycle-life and stability of a rechargeable lithium battery is actively researched.

SUMMARY

Aspects of embodiments of the present invention are directed toward an electrolyte for a rechargeable lithium battery having improved cycle-life characteristic and thermal stability, and a rechargeable lithium battery including the electrolyte.

In an embodiment, an electrolyte for a rechargeable lithium battery is provided, the electrolyte including a lithium salt, a non-aqueous organic solvent, and an additive, the additive including a compound represented by the following Chemical Formula 1:

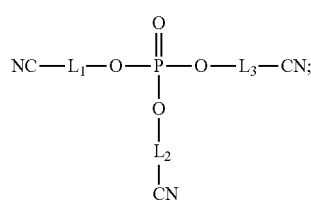

[Chemical Formula 1]

wherein $L_1$ to $L_3$ are each independently selected from a substituted or unsubstituted ethylene group and a substituted or unsubstituted propylene group.

In one embodiment, the compound represented by Chemical Formula 1 is a compound represented by the following Chemical Formula 1-1 or a compound represented by the following Chemical Formula 1-2:

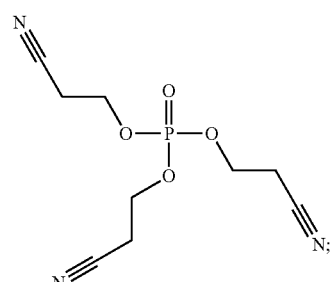

[Chemical Formula 1-1]

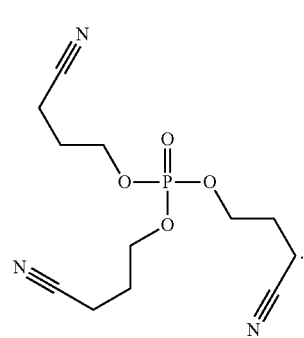

[Chemical Formula 1-2]

In one embodiment, the compound represented by Chemical Formula 1 is included in an amount of about 0.1 parts by weight to about 5 parts by weight based on 100 parts by weight of the non-aqueous organic solvent.

In one embodiment, the additive further includes a cyclic sultone derivative.

In one embodiment, the cyclic sultone derivative is selected from 1,3-propanesultone (PS), 1-methyl-1,3-propanesultone, 2-methyl-1,3-propanesultone, 3-methyl-1,3-propanesultone, 1-ethyl-1,3-propanesultone, 2-ethyl-1,3-propanesultone, 3-ethyl-1,3-propanesultone, 1,2-dimethyl-1,3-propanesultone, 1,3-dimethyl-1,3-propanesultone, 2,3-dimethyl-1,3-propanesultone, 1-methyl-2-ethyl-1,3-propanesultone, 1-methyl-3-ethyl-1,3-propanesultone, 2-methyl-3-ethyl-1,3-propanesultone, 1-ethyl-2-methyl-1,3-propanesultone, 1-ethyl-3-methyl-1,3-propanesultone, 2-ethyl-3-methyl-1,3-propanesultone, 1-fluoromethyl-1,3-propanesultone, 2-fluoromethyl-1,3-propanesultone, 3-fluoromethyl-1,3-propanesultone, 1-trifluoromethyl-1,3-propanesultone, 2-trifluoromethyl-1,3-propanesultone, 3-trifluoromethyl-1,3-propanesultone, 1-fluoro-1,3-propanesultone, 2-fluoro-1,3-propanesultone, 3-fluoro-1,3-propanesultone, 1,2-difluoro-1,3-propanesultone, 1,3-difluoro-1,3-propanesultone, and 2,3-difluoro-1,3-propanesultone.

In one embodiment, the cyclic sultone derivative is 1,3-propanesultone (PS).

In one embodiment, the cyclic sultone derivative is included in an amount of about 0.1 parts to about 5 parts by weight based on 100 parts by weight of the non-aqueous organic solvent.

In one embodiment, the additive further includes an aliphatic dinitrile compound.

In one embodiment, the aliphatic dinitrile compound is a C1 to C12 linear or branched dinitrile compound.

In one embodiment, the aliphatic dinitrile compound is selected from succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 2,5-dimethyl-2,5-hexane dicarbonitrile, 2,6-dicyanoheptane, 2,7-dicyanooctane, 2,8-dicyanononane, and 1,6-dicyanodecane.

In one embodiment, the aliphatic dinitrile compound is included in an amount of about 0.1 parts to about 5 parts by weight based on 100 parts by weight of the non-aqueous organic solvent.

In another embodiment, a rechargeable lithium battery is provided, the battery including a positive electrode, a negative electrode, and the electrolyte.

In one embodiment, in the rechargeable lithium battery, the compound represented by Chemical Formula 1 is included in an amount of about 0.1 parts by weight to about 5 parts by weight based on 100 parts by weight of the non-aqueous organic solvent.

In one embodiment, in the rechargeable lithium battery, the additive further includes a cyclic sultone derivative.

In one embodiment, in the rechargeable lithium battery, the cyclic sultone derivative is included in an amount of about 0.1 parts to about 5 parts by weight based on 100 parts by weight of the non-aqueous organic solvent.

In one embodiment, in the rechargeable lithium battery, the additive further includes an aliphatic dinitrile compound.

In one embodiment, in the rechargeable lithium battery, the aliphatic dinitrile compound is included in an amount of about 0.1 parts to about 5 parts by weight based on 100 parts by weight of the non-aqueous organic solvent.

According to some embodiments, the electrolyte for a rechargeable lithium battery and a rechargeable lithium battery including the same, have an improved cycle-life characteristic and thermal stability.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
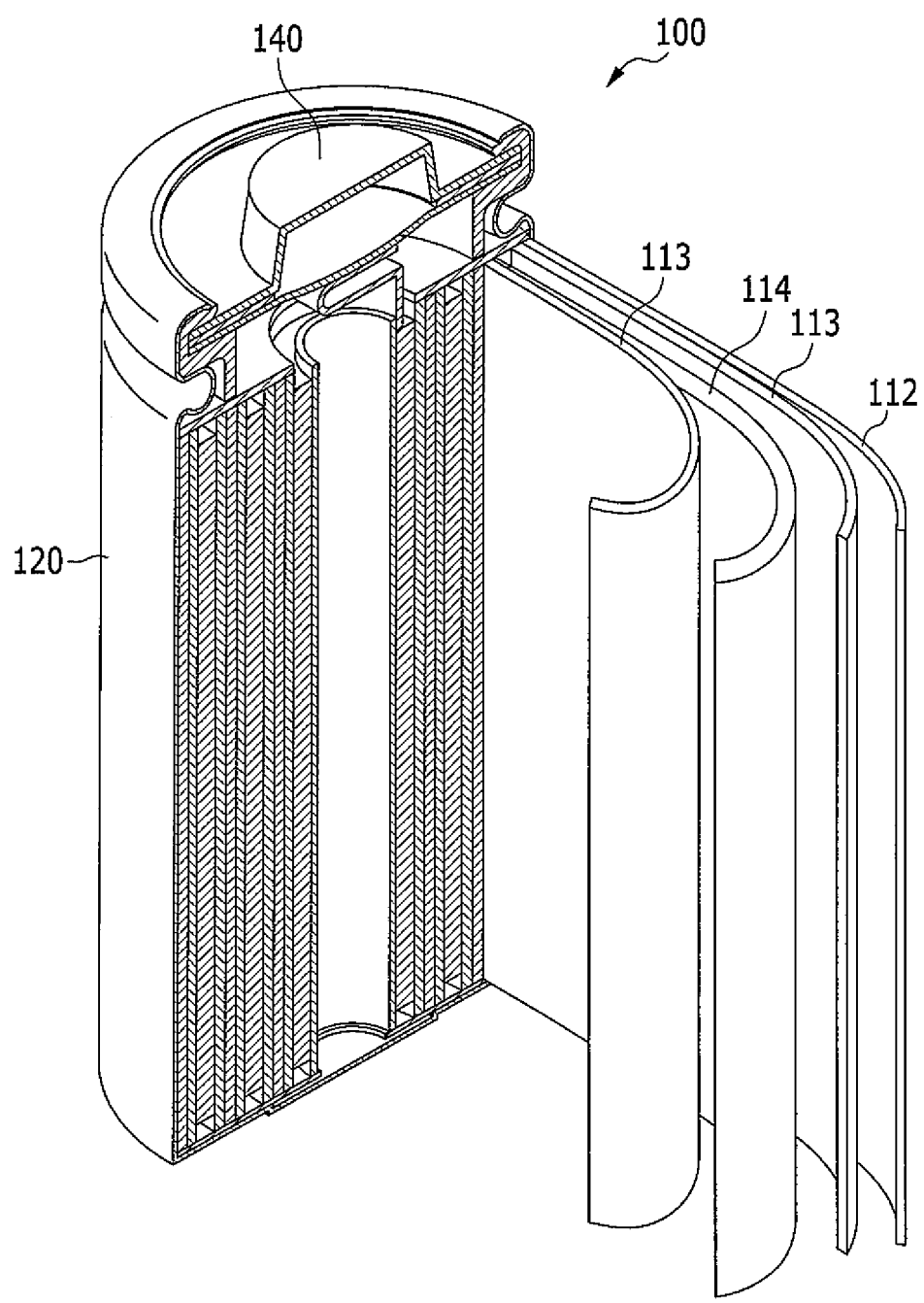
FIG. 1 is a schematic view showing a rechargeable lithium battery according to one embodiment.

In the following detailed description, only certain embodiments of the present invention are shown and described, by way of illustration. As those skilled in the art would recognize, the invention may be embodied in many different forms and should not be construed as being limited to the embodiments set forth herein.

In the drawings, thicknesses of layers, films, panels, regions, and other elements shown therein, are exaggerated for clarity. Like reference numerals designate like elements throughout the specification. Also, in the context of the present application, it will be understood that when an element such as a layer, film, region, or substrate is referred to as being "above" or "on" another element, it can be directly above or on the other element, or indirectly above or on the other element, with one or more intervening elements interposed therebetween. In contrast, when an element is referred to as being "directly above" or "directly on" another element, there are no intervening elements present.

As used herein, and according to embodiments of the present invention, when a definition is not otherwise provided, the term "substituted" refers to, for example, substitution of one or more of a hydrogen in a compound, with a substituent independently selected from a C1 to C30 alkyl group; a C2 to C30 alkenyl group, a C2 to C30 alkynyl group, a C1 to C10 alkylsilyl group; a C3 to C30 cycloalkyl group; a C6 to C30 aryl group; a C1 to C30 heteroaryl group; a C1 to C10 alkoxy group; a silane group; an alkylsilane group; an alkoxysilane group; an amine group; an alkylamine group; an arylamine group; and a halogen.

As used herein, and according to embodiments of the present invention, when a definition is not otherwise provided, the term "alkyl group" refers to, for example, a saturated alkyl group without any alkenyl group or alkynyl group or an unsaturated alkyl group with at least one alkenyl group or alkynyl group. The term "alkenyl group" as used herein refers to, for example, a substituent having at least one carbon-carbon double bond, and the term "alkyne group" as used herein refers to, for example, a substituent having at least one carbon-carbon triple bond. In some embodiments, the alkyl group is branched. In some embodiments, the alkyl group is linear. In some embodiments, the alkyl group is cyclic.

An electrolyte for a rechargeable lithium battery according to an embodiment includes a lithium salt, a non-aqueous organic solvent, and an additive.

Additive

In one embodiment, the additive includes a compound represented by the following Chemical Formula 1:

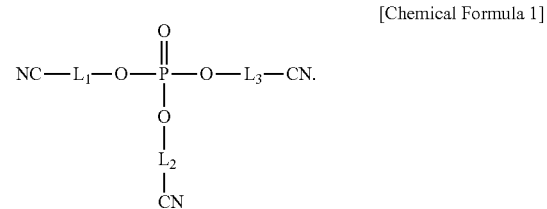

[Chemical Formula 1]

In Chemical Formula 1, $L_1$ to $L_3$ are each independently selected from a substituted or unsubstituted ethylene group and a substituted or unsubstituted propylene group. In one embodiment, the compound represented by Chemical Formula 1 is used as an electrolyte additive for a rechargeable lithium battery and, in some embodiments improves a cycle-life characteristic and high temperature safety of the rechargeable lithium battery.

In one embodiment, the compound represented by Chemical Formula 1 includes, for example, a compound represented by the following Chemical Formula 1-1 or the following Chemical Formula 1-2:

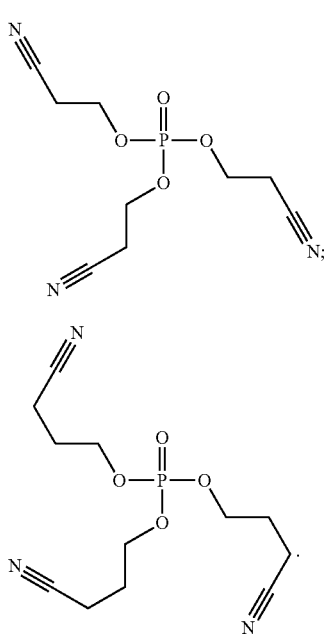

[Chemical Formula 1-1]

[Chemical Formula 1-2]

The compound represented by Chemical Formula 1 has a nitrile group (—CN) and thus, can form a coordination bond with a metal (e.g., cobalt) of a positive active material and, in some embodiments, improves stability of the positive electrode. In addition, the compound represented by Chemical Formula 1 has relatively short lengths of $L_1$ to $L_3$ between an oxygen (—O—) group and a nitrile (—CN) group (that is, a distance between the oxygen (—O—) group and the nitrile (—CN) group is relatively short), and thus, in some embodiments, the nitrile (—CN) group forms an electronic cloud with a P=O double bond, and forms a film on a negative electrode. Accordingly, in some embodiments, the compound represented by Chemical Formula 1 simultaneously improves stability of the positive and negative electrodes. In addition, in some embodiments, the compound represented by Chemical Formula 1, like a general phosphate-based material, can attract a lithium salt from an electrolyte and suppress generation of gas and thus, in some embodiments, improves thermal stability of a rechargeable lithium battery.

The compound represented by Chemical Formula 1 includes three nitrile (—CN) groups, and thus can form more coordination bonds with a positive electrode than a compound having 1 or 2 nitrile groups, which in some embodiments, allows for an improved stability of the positive electrode. More specifically, the stability improvement of the positive electrode will be illustrated in the following Evaluation Example 4.

In some embodiments, the compound represented by Chemical Formula 1 has an ethylene group having two carbons or a propylene group having three carbons in a chain between the oxygen (—O—) group and the nitrile (—CN) group. In these embodiments, the compound represented by Chemical Formula 1 has a molecular weight within a suitable range and thus, in some embodiments, is not be oxidized in an electrolyte for a rechargeable lithium battery, and has high reduction stability. Such effects are illustrated by way of Example in Evaluation Example 5.

In one embodiment, the compound represented by Chemical Formula 1 is included in an amount of about 0.1 parts to about 5 parts by weight based on 100 parts by weight of the non-aqueous organic solvent. In one embodiment, the compound represented by Chemical Formula 1 is included in an amount of about 0.1 parts to about 4 parts by weight based on 100 parts by weight of the non-aqueous organic solvent. In one embodiment, the compound represented by Chemical Formula 1 is included in an amount of about 0.1 parts to about 3 parts by weight based on 100 parts by weight of the non-aqueous organic solvent. In one embodiment, the compound represented by Chemical Formula 1 is included in an amount of about 1 part to about 3 parts by weight based on 100 parts by weight of the non-aqueous organic solvent. In some embodiments, when the compound represented by Chemical Formula 1 is included within these amount ranges, cycle-life characteristic and thermal stability of a rechargeable lithium battery are improved, and the rechargeable lithium battery maintains a good balance of properties.

In one embodiment, the additive further includes a cyclic sultone derivative. In one embodiment, the cyclic sultone derivative forms a solid electrolyte interphase (SEI) film on a negative electrode and thus, in some embodiments, stabilizes the negative electrode and improves cycle-life characteristics of a rechargeable lithium battery. Particularly, in some embodiments, the cyclic sultone derivative forms a strong film at a high temperature and thus, in some embodiments, improves stability and cycle-life characteristic of a rechargeable lithium battery at a high temperature.

Examples of the cyclic sultone derivative include, but are not limited to 1,3-propanesultone (PS), 1-methyl-1,3-propanesultone, 2-methyl-1,3-propanesultone, 3-methyl-1,3-propanesultone, 1-ethyl-1,3-propanesultone, 2-ethyl-1,3-propanesultone, 3-ethyl-1,3-propanesultone, 1,2-dimethyl-1,3-propanesultone, 1,3-dimethyl-1,3-propanesultone, 2,3-dimethyl-1,3-propanesultone, 1-methyl-2-ethyl-1,3-propanesultone, 1-methyl-3-ethyl-1,3-propanesultone, 2-methyl-3-ethyl-1,3-propanesultone, 1-ethyl-2-methyl-1,3-propanesultone, 1-ethyl-3-methyl-1,3-propanesultone, 2-ethyl-3-methyl-1,3-propanesultone, 1-fluoromethyl-1,3-propanesultone, 2-fluoromethyl-1,3-propanesultone, 3-fluoromethyl-1,3-propanesultone, 1-trifluoromethyl-1,3-propanesultone, 2-trifluoromethyl-1,3-propanesultone, 3-trifluoromethyl-1,3-propanesultone, 1-fluoro-1,3-propanesultone, 2-fluoro-1,3-propanesultone, 3-fluoro-1,3-propanesultone, 1,2-difluoro-1,3-propanesultone, 1,3-difluoro-1,3-propanesultone and 2,3-difluoro-1,3-propanesultone, and the like. In some embodiments, among these derivatives, 1,3-propanesultone (PS) is used, because it is a small molecule.

In one embodiment, the cyclic sultone derivative is included in an amount of about 0.1 parts to about 5 parts by weight based on 100 parts by weight of the non-aqueous organic solvent. In one embodiment, the cyclic sultone derivative is included in an amount of about 0.1 parts to about 4 parts by weight based on 100 parts by weight of the non-aqueous organic solvent. In one embodiment, the cyclic sultone derivative is included in an amount of about 0.1 parts to about 3 parts by weight based on 100 parts by weight of the non-aqueous organic solvent. In one embodiment, the cyclic sultone derivative is included in an amount of about 1 part to about 3 parts by weight based on 100 parts by weight of the non-aqueous organic solvent. In some embodiments, when the cyclic sultone derivative is included within these amount ranges, cycle-life characteristic and thermal stability of a rechargeable lithium battery are improved and the rechargeable lithium battery maintains a good balance of properties.

In one embodiment, the additive further includes an aliphatic dinitrile compound. In one embodiment, the aliphatic dinitrile compound forms a film on the surface of a positive active material during an initial charge and suppresses decomposition and/or gasification of an electrolyte on the surface of the positive active material and/or suppresses continuous elution of a metal ion such as nickel, manganese, or the like from the positive active material.

In one embodiment, the aliphatic dinitrile compound is a C1 to C12 linear or branched dinitrile compound, having in some embodiments, at least one substituent. Examples of the aliphatic dinitrile compound include, but are not limited to succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 2,5-dimethyl-2,5-hexane dicarbonitrile, 2,6-dicyanoheptane, 2,7-dicyanooctane, 2,8-dicyanononane, and 1,6-dicyanodecane. Specifically, in some embodiments, succinonitrile or sebaconitrile are used.

In one embodiment, the aliphatic dinitrile compound is included in an amount of about 0.1 parts to about 5 parts by weight based on 100 parts by weight of the non-aqueous organic solvent. In one embodiment, the aliphatic dinitrile compound is included in an amount of about 0.1 parts to about 4 parts by weight based on 100 parts by weight of the non-aqueous organic solvent. In one embodiment, the aliphatic dinitrile compound is included in an amount of about 0.1 parts to about 3 parts by weight based on 100 parts by weight of the non-aqueous organic solvent. In one embodiment, the aliphatic dinitrile compound is included in an amount of about 1 part to about 3 parts by weight based on 100 parts by weight of the non-aqueous organic solvent. In some embodiments, when the aliphatic dinitrile compound is included within these ranges, cycle-life characteristic and thermal stability of a rechargeable lithium battery are improved.

Non-Aqueous Organic Solvent

Examples of the non-aqueous organic solvent include, but are not limited to a carbonate-based, an ester-based, an ether-based, a ketone-based, an alcohol-based, or an aprotic solvent. Examples of the carbonate-based solvent include, but are not limited to dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent include, but are not limited to methyl acetate, ethyl acetate, n-propyl acetate, dimethylacetate, methylpropinonate, ethylpropinonate, γ-butyrolactone, decanolide, valerolactone, mevalonolactone, caprolactone, and the like. Examples of the ether-based solvent include, but are not limited to dimethyl ether, dibutyl ether, tetraglyme, diglyme, dimethoxyethane, 2-methyltetrahydrofuran, tetrahydrofuran (THF), and the like. Examples of the ketone-based solvent include, but are not limited to cyclohexanone, and the like. Examples of the alcohol-based solvent include, but are not limited to ethanol, isopropylalcohol, and the like. Examples of the aprotic solvent include, but are not limited to nitriles such as R—CN (wherein R is a C2 to C20 linear, branched, or cyclic hydrocarbon group, and in some embodiments including one or more double bonds, one or more aromatic rings, or one or more ether bonds), amides such as dimethylformamide or dimethylacetamide, dioxolanes such as 1,3-dioxolane, sulfolanes, and the like.

In some embodiments, the non-aqueous organic solvent is used singularly and in other embodiments the non-aqueous organic solvent is used in a mixture (i.e. a mixture of two or more non-aqueous organic solvents). In some embodiments, when the organic solvent is used in a mixture, its mixture ratio can be controlled in accordance with desirable performance of a battery.

In some embodiments, the carbonate-based solvent includes a mixture of a cyclic carbonate and a linear carbonate. In some embodiments, when the cyclic carbonate and the linear carbonate are mixed together in a volume ratio of about 1:1 to about 1:9 as an electrolyte, the electrolyte has enhanced performance.

In some embodiments, the non-aqueous organic solvent is prepared by further adding an aromatic hydrocarbon-based solvent to the carbonate-based solvent. In some embodiments, the carbonate-based solvent and the aromatic hydrocarbon-based solvent are mixed together in a volume ratio of about 1:1 to about 30:1.

In some embodiments, the aromatic hydrocarbon-based organic solvent is an aromatic hydrocarbon-based compound represented by the following Chemical Formula A.

[Chemical Formula A]

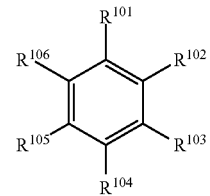

In Chemical Formula A, $R^{101}$ to $R^{106}$ are each independently selected from hydrogen, a halogen, a C1 to C10 alkyl group, and a C1 to C10 haloalkyl group.

Examples of the aromatic hydrocarbon based organic solvent include, but are not limited to benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In some embodiments, the non-aqueous electrolyte further includes vinylene carbonate or an ethylene carbonate-based compound represented by the following Chemical Formula 2 in order to improve cycle-life of a battery:

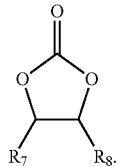

[Chemical Formula 2]

In Chemical Formula 2, $R_7$ and $R_8$ are each independently selected from hydrogen, a halogen, a cyano group (CN), a nitro group ($NO_2$), and a C1 to C5 fluoroalkyl group, wherein at least one of $R_7$ and $R_8$ is a halogen, a cyano group (CN), a nitro group ($NO_2$), or a C1 to C5 fluoroalkyl group.

Examples of the ethylene carbonate-based compound include, but are not limited to difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. In some embodiments, an amount of the vinylene carbonate or the ethylene carbonate-based compound is adjusted within a range suitable to improve cycle-life of the rechargeable lithium battery.

Lithium Salt

In some embodiments, the lithium salt is dissolved in the non-aqueous solvent and supplies lithium ions in a rechargeable lithium battery to operate the rechargeable lithium battery and improve lithium ion transfer between positive and negative electrodes. In some embodiments, the lithium salt includes at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are non-zero natural numbers), LiCl, LiI, $LiB(C_2O_4)_2$ (lithium bis(oxalato) borate, LiBOB), and a combination thereof. In some embodiments, the lithium salt is used in a concentration of about 0.1 M to about 2.0M. In some embodiments, when the lithium salt is included within the above concentration range, electrolyte performance and lithium ion mobility are improved due to improved electrolyte conductivity and viscosity.

In one embodiment, a rechargeable lithium battery including a positive electrode, a negative electrode, and the electrolyte is provided.

By way of example, the rechargeable lithium battery can be a lithium ion battery, a lithium ion polymer battery, or a lithium polymer battery, classified according to presence of a separator and a kind of an electrolyte used therein. The rechargeable lithium battery according to embodiments of the present invention, can have a variety of suitable shapes and sizes and thus, includes, but is not limited to a cylindrical battery, a prismatic battery, a coin battery, and a pouch battery, and also can be a thin film battery or a bulky battery in size. The structure and manufacturing method for a rechargeable lithium battery according to embodiments of the present invention include those known in the art.

FIG. 1 is an exploded perspective view of a rechargeable lithium battery according to one embodiment. Referring to FIG. 1, the rechargeable lithium battery 100 is a cylindrical battery including a negative electrode 112, a positive electrode 114, and a separator 113 interposed between the negative electrode 112 and positive electrode 114, an electrolyte impregnated in the negative electrode 112, positive electrode 114, and separator 113, a battery case 120, and a sealing member 140 sealing the battery case 120. In one embodiment, the rechargeable lithium battery 100 is fabricated by sequentially laminating the negative electrode 112, the positive electrode 114, and the separator 113, spirally winding them, and housing the spiral-wound product in the battery case 120.

The electrolyte is the same as described above.

Positive Electrode

In one embodiment, the positive electrode 114 includes a current collector and a positive active material layer disposed on the current collector.

In one embodiment, the current collector is an Al current collector, but is not limited thereto.

In one embodiment, the positive active material layer includes a positive active material and a binder. In one embodiment, the positive active material layer further includes a conductive material.

In one embodiment, the positive active material includes lithiated intercalation compounds that reversibly intercalate and deintercalate lithium ions. In one embodiment, the positive active material includes a composite oxide including at least one selected from cobalt, manganese, and nickel, and lithium. Specific examples include compounds represented by the following Chemical Formulae:

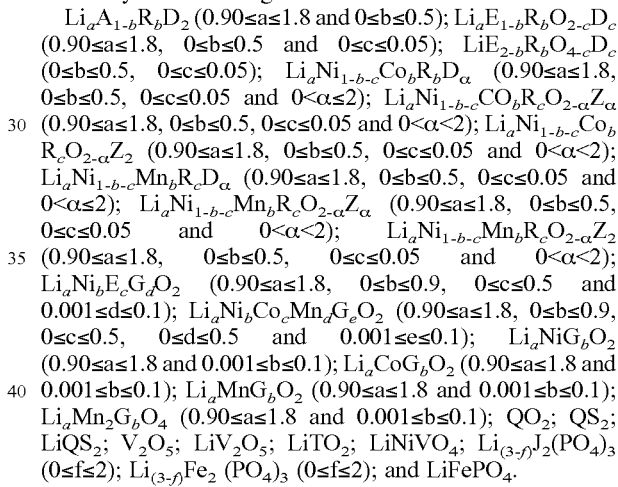

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In some embodiments, the positive active material is a compound with a coating layer on the surface or a mixture of the active material and a compound with the coating layer on the surface. In some embodiments, the coating layer includes at least one coating element compound selected from an oxide of the coating element, a hydroxide of the coating element, an oxyhydroxide of the coating element, an oxycarbonate of the coating element, and a hydroxycarbonate of the coating element. In some embodiments, the compound for the coating layer includes amorphous or crystalline compounds. Examples of the coating element included in the coating layer, include but are not limited to Mg, Al, Co, K, Na, Ca, Si, Ti, V, Sn, Ge, Ga, B, As, Zr, and a mixture thereof. In some embodiments, a coating process includes any suitable coating process, which avoids or substantially avoids causing side effects on properties of the positive active material (e.g., spray coating, immersing, etc.).

In some embodiments, the binder improves binding properties of the positive active material particles to one another and to a current collector. Examples of the binder include, but are not limited to polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

In some embodiments, the conductive material improves electrical conductivity of a negative electrode. In some embodiments, any suitable electrically conductive material, which avoids or substantially avoids causing a chemical change, can be used as a conductive agent. Examples of the conductive material include, but are not limited to natural graphite, artificial graphite, carbon black (e.g. Super-P), acetylene black, ketjen black, a carbon fiber, and a metal powder or fiber including copper, nickel, aluminum, silver, and/or the like. For example, in some embodiments, a conductive material such as a polyphenylene derivative or the like are mixed.

Negative Electrode

In some embodiments, the negative electrode 112 includes a current collector and a negative active material layer disposed on at least one side of the current collector, the negative active material layer including a negative active material.

Examples of the negative active material include, but are not limited to a material that reversibly intercalates/deintercalates lithium ions, a lithium metal, a lithium metal alloy, a material being capable of doping and dedoping lithium, and a transition metal oxide.

In some embodiments, the material that reversibly intercalates/deintercalates lithium ions is a carbon material. Examples of the carbon material include, but are not limited to any carbon-based negative active material suitable for use in a rechargeable lithium battery. Specific examples of the carbon material include, but are not limited to crystalline carbon, amorphous carbon, and a mixture thereof. The crystalline carbon includes, but is not limited to non-shaped, sheet, flake, spherical, and fiber shaped natural graphite or artificial graphite, The amorphous carbon includes, but is not limited to a soft carbon, a hard carbon, mesophase pitch carbonization products, fired coke, and the like.

Examples of the lithium metal alloy include, but are not limited to lithium and a metal of Na, K, Rb, Cs, Fr, Be, Mg, Ca, Sr, Si, Sb, Pb, In, Zn, Ba, Ra, Ge, Al, and/or Sn.

Examples of the material being capable of doping and dedoping lithium include, but are not limited to Si, $SiO_x$ ($0<x<2$), a Si—C composite, a Si-Q alloy (wherein Q is an alkali metal, an alkaline-earth metal, Group 13 to 16 elements (excluding Si), transition elements, a rare earth element and a combination thereof), Sn, $SnO_2$, a Sn—C composite, a Sn—R alloy (wherein R is an alkali metal, an alkaline-earth metal, Group 13 to 16 elements (excluding Sn), transition elements, a rare earth element, or a combination thereof), and the like. Examples of elements Q and R include, but are not limited to Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

Examples of the transition metal oxide include, but are not limited to vanadium oxide, lithium vanadium oxide, and the like.

In some embodiments, the negative active material layer includes a binder. In some embodiments, the negative active material layer further includes a conductive material.

In some embodiments, the binder improves properties of binding active material particles with one another and a negative active material with a current collector. Examples of the binder include, but are not limited to polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

In some embodiments, the conductive material improves electrical conductivity of a negative electrode. In some embodiments, any suitable electrically conductive material, which avoids or substantially avoids causing a chemical change, can be used as a conductive agent. Examples of the conductive material include, but are not limited to a carbon-based material such as natural graphite, artificial graphite, carbon black (e.g. Super-P), acetylene black, ketjen black, a carbon fiber, or the like; a metal-based material of a metal powder or a metal fiber including copper, nickel, aluminum, silver, and the like; a conductive polymer such as a polyphenylene derivative, or the like; and a mixture thereof.

Examples of the current collector include, but are not limited to a copper foil, a nickel foil, a stainless steel foil, a titanium foil, a nickel foam, a copper foam, a polymer substrate coated with a conductive metal, and a combination thereof.

In some embodiments, the negative electrode 112 and positive electrode 114 are manufactured by a method of preparing an active material composition, for example, by mixing the active material and a binder in a solvent such as N-methylpyrrolidone or the like (but not limited thereto), and in some embodiments also mixing a conductive material, and coating the active material composition on a current collector.

Separator

The rechargeable lithium battery according to one embodiment includes the separator 113. In some embodiments, the separator includes any suitable separator material for a rechargeable lithium battery, that is, any separator suitable for separating a negative electrode from a positive electrode and providing a transporting passage for lithium ions, such as a separator made of a material having low resistance to ion transportation and good impregnation for an electrolyte. Examples of the material for the separator include, but are not limited to, fiberglass, polyester, TEFLON® (tetrafluoroethylene), polyethylene, polypropylene, polytetrafluoroethylene (PTFE), and a combination thereof, having a form of a non-woven fabric or a woven fabric. For example, in some embodiments, a polyolefin-based polymer separator such as polyethylene, polypropylene or the like is used. In some embodiments, in order to allow for heat resistance and/or mechanical strength, a coated separator including a ceramic component or a polymer material is used and can have a mono-layered or multi-layered structure.

The following examples illustrate the aspects of present invention described above, in more detail. These examples, however, should not in any sense be interpreted as limiting the scope of the present invention.

For reference, each electrolyte composition according to the following Examples 1 to 4 and Comparative Examples 1 to 11 is provided in the following Table 1.

Example 1

A positive electrode was fabricated by mixing 97.4 wt % of LiCoO$_2$ as a positive active material, 1.3 wt % of polyvinylidene fluoride as a binder, and 1.3 wt % of Super-P as a conductive material, dispersing the mixture into N-methylpyrrolidone to prepare a positive active material layer composition, coating the positive active material layer composition on an aluminum foil, and then, drying and compressing the coated composition.

A negative electrode was fabricated by mixing 98 wt % of graphite as a negative active material, 1 wt % of polyvinylidene fluoride as a binder, and 1 wt % of Super-P as a conductive material, dispersing the mixture into N-methylpyrrolidone to prepare a negative active material layer composition, coating the negative active material layer composition on a copper foil, and then, drying and compressing the coated negative active material layer composition.

Then, an electrolyte was prepared by mixing ethylenecarbonate (EC) and ethyl methylcarbonate (EMC) in a volume ratio of 3:7 to prepare a mixed solution, adding LiPF$_6$ to provide a 1M of a concentration of the mixed solution, and adding 2 parts by weight of a compound represented by the following Chemical Formula 1-1 as an electrolyte additive to the mixture. 2 parts by weight of the compound represented by the following Chemical Formula 1-1 was based on 100 parts by weight of the ethylene carbonate and ethyl methylcarbonate:

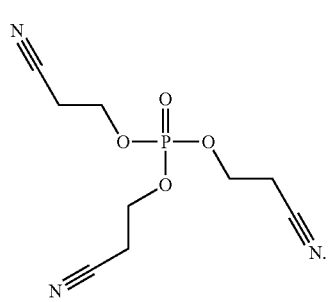 [SMILES: N#CCCOP(=O)(OCCC#N)OCCC#N]

[Chemical Formula 1-1]

The positive and negative electrodes and a separator made of polypropylene were put in a battery case, and the electrolyte was injected therein, thus fabricating a rechargeable lithium battery cell.

Example 2

A rechargeable lithium battery cell was fabricated according to the same method as Example 1 except that ethylene carbonate (EC):ethyl methyl carbonate (EMC):diethyl carbonate (DEC) were mixed in a volume ratio of 3:5:2 to prepare a mixed solution, LiPF$_6$ was added to provide a concentration of 0.9M of the mixed solution, and 3 parts by weight of a compound represented by Chemical Formula 1-1 and 2 parts by weight of 1,3-propanesultone (PS) were added as an electrolyte additive.

Example 3

A rechargeable lithium battery cell was fabricated according to the same method as Example 2 except that 2 parts by weight of a compound represented by Chemical Formula 1-1, 1 part by weight of 1,3-propanesultone (PS), and 1 part by weight of succinonitrile (SN) were used as an electrolyte additive.

Example 4

A rechargeable lithium battery cell was fabricated according to the same method as Example 2 except that 1 part by weight of a compound represented by Chemical Formula 1-1 was used as an electrolyte additive.

Comparative Example 1

A rechargeable lithium battery cell was fabricated according to the same method as Example 1 except that a compound represented by Chemical Formula 1-1 was used as an electrolyte additive.

Comparative Example 2

A rechargeable lithium battery cell was fabricated according to the same method as Example 2 except that 2 parts by weight of 1,3-propanesultone and 3 parts by weight of succinonitrile were used instead of the compound represented by Chemical Formula 1-1 as an electrolyte additive.

Comparative Example 3

A rechargeable lithium battery cell was fabricated according to the same method as Example 2 except that 1 part by weight of 1,3-propanesultone was used instead of the compound represented by Chemical Formula 1-1 as an electrolyte additive.

Comparative Example 4

A rechargeable lithium battery cell was fabricated according to the same method as Example 2 except that 1 part by weight of 1,3-propanesultone and 3 parts by weight of succinonitrile were used instead of the compound represented by Chemical Formula 1-1 as an electrolyte additive.

Comparative Example 5

A rechargeable lithium battery cell was fabricated according to the same method as Example 4 except that a compound represented by Chemical Formula 1-1 and another compound represented by the following Chemical Formula 2-1 were used as an electrolyte additive.

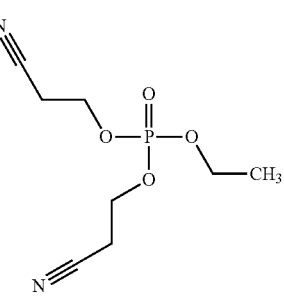

[Chemical Formula 2-1]

Comparative Example 6

A rechargeable lithium battery cell was fabricated according to the same method as Example 4 except that a compound represented by Chemical Formula 1-1 and another compound represented by the following Chemical Formula 2-2 were used as an electrolyte additive.

[Chemical Formula 2-2]

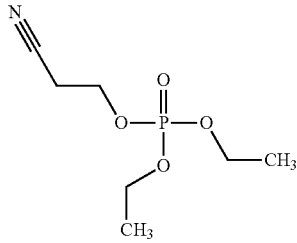

Comparative Example 7

A rechargeable lithium battery cell was fabricated according to the same method as Example 4 except that no compound represented by Chemical Formula 1-1 was used as an electrolyte additive.

Comparative Example 8

A rechargeable lithium battery cell was fabricated according to the same method as Example 4 except that no compound represented by Chemical Formula 1-1 was used, and instead a compound represented by the following Chemical Formula 3-1 was used as an electrolyte additive.

[Chemical Formula 3-1]

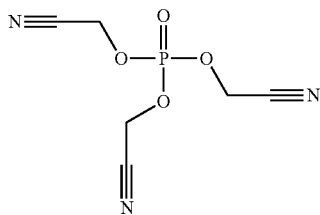

Comparative Example 9

A rechargeable lithium battery cell was fabricated according to the same method as Example 4 except that no compound represented by Chemical Formula 1-1 was used, and instead a compound represented by the following Chemical Formula 3-2 was used as an electrolyte additive.

[Chemical Formula 3-2]

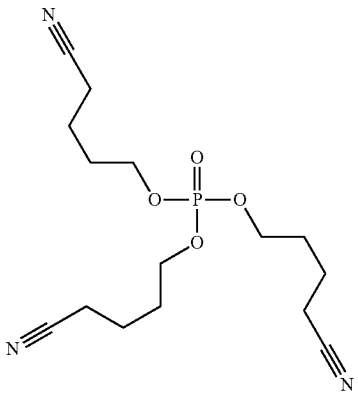 [SMILES: N#CCCCCOP(=O)(OCCCCC#N)OCCCCC#N]

Comparative Example 10

A rechargeable lithium battery cell was fabricated according to the same method as Example 4 except that no compound represented by Chemical Formula 1-1 was used, and instead 3 parts by weight of succinonitrile was used as an electrolyte additive.

Comparative Example 11

A rechargeable lithium battery cell was fabricated according to the same method as Example 4 except that no compound represented by Chemical Formula 1-1 was used, and instead 1 part by weight of B-base was used as an electrolyte additive. B-base has a structure shown in the following Chemical Formula 4-1.

[Chemical Formula 4-1]

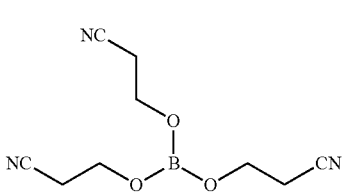

The following Table 1 shows the compositions of the electrolytes according to Examples 1 to 4 and Comparative Examples 1 to 11.

TABLE 1

|  |  | Examples | | | | Comparative Examples | | | | | | | | | | |
| --- | --- | --- | --- | --- | --- | --- | --- | --- | --- | --- | --- | --- | --- | --- | --- |
|  |  | 1 | 2 | 3 | 4 | 1 | 2 | 3 | 4 | 5 | 6 | 7 | 8 | 9 | 10 | 11 |
| Electrolyte | EC/EMC 3:7 LiPF$_6$ 1M | 100 | — | — | — | 100 | — | — | — | — | — | — | — | — | — | — |
|  | EC/EMC/DEC 3:5:2 LiPF$_6$ 0.9M | — | 100 | 100 | 100 | — | 100 | 100 | 100 | 100 | 100 | 100 | 100 | 100 | 100 | 100 |
| Additive | Chemical Formula 1-1 | 2 | 3 | 2 | 1 | — | — | — | — | — | — | — | — | — | — | — |
|  | 1,3-propanesultone | — | 2 | 1 | — | — | 2 | 1 | 1 | — | — | — | — | — | — | — |
|  | succinonitrile | — | — | 1 | — | — | 3 | — | 3 | — | — | — | — | — | 3 | — |

TABLE 1-continued

| | Examples | | | | Comparative Examples | | | | | | | | | | |
|---|---|---|---|---|---|---|---|---|---|---|---|---|---|---|---|
| | 1 | 2 | 3 | 4 | 1 | 2 | 3 | 4 | 5 | 6 | 7 | 8 | 9 | 10 | 11 |
| Chemical Formula2-1 | — | — | — | — | — | — | — | — | 1 | — | — | — | — | — | — |
| Chemical Formula2-2 | — | — | — | — | — | — | — | — | — | 1 | — | — | — | — | — |
| Chemical Formula3-1 | — | — | — | — | — | — | — | — | — | — | 1 | — | — | — | — |
| Chemical Formula3-2 | — | — | — | — | — | — | — | — | — | — | — | 1 | — | — | — |
| B-base | — | — | — | — | — | — | — | — | — | — | — | — | — | — | 1 |

Evaluation Example 1: Cycle-Life Characteristic of Rechargeable Lithium Battery Cell with Varying Voltage The rechargeable lithium battery cells according to Example 1 and Comparative Example 1 were measured regarding specific discharge capacity change with repeated cycles, by varying a voltage as follows: 4.35V, 4.45V, and 4.55V (charge: 0.5 C, discharge: 0.5 C, temperature: 45° C.).

Figure 2:
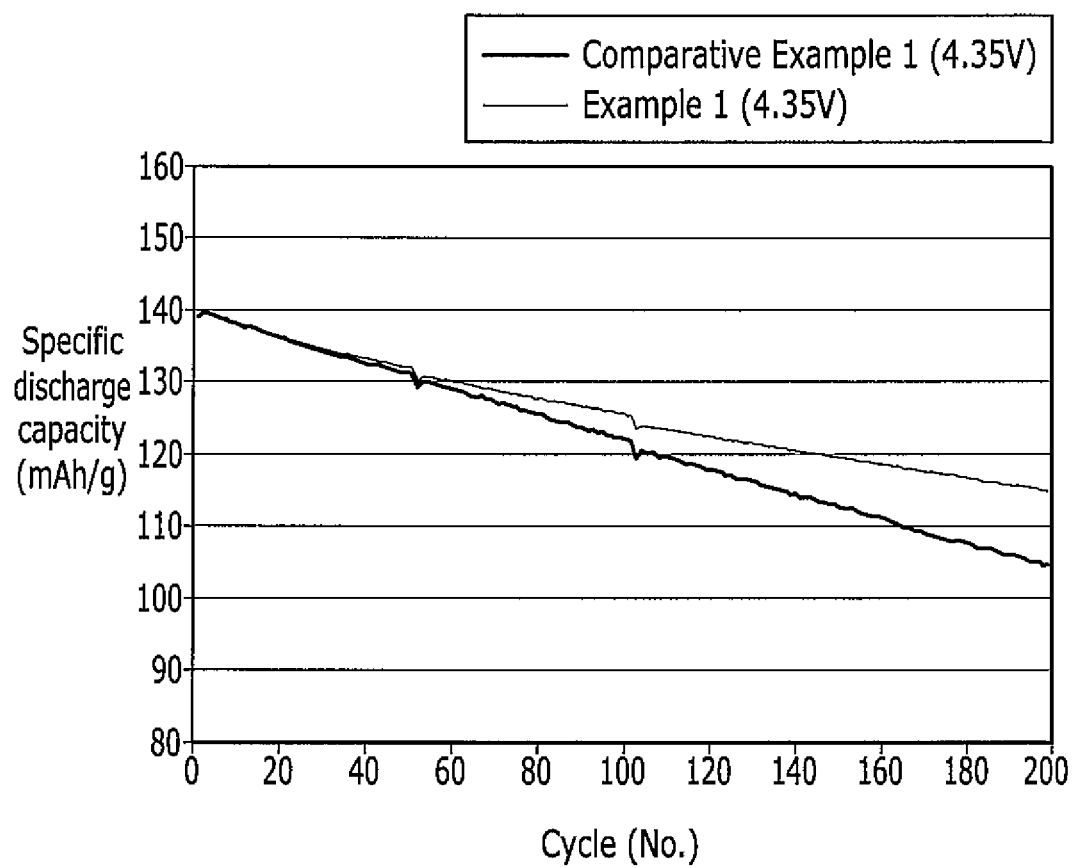
FIGS. 2 to 4 are graphs showing cycle-life characteristics of rechargeable lithium battery cells according to Example 1 and Comparative Example 1 with varying voltage.
Figure 3:
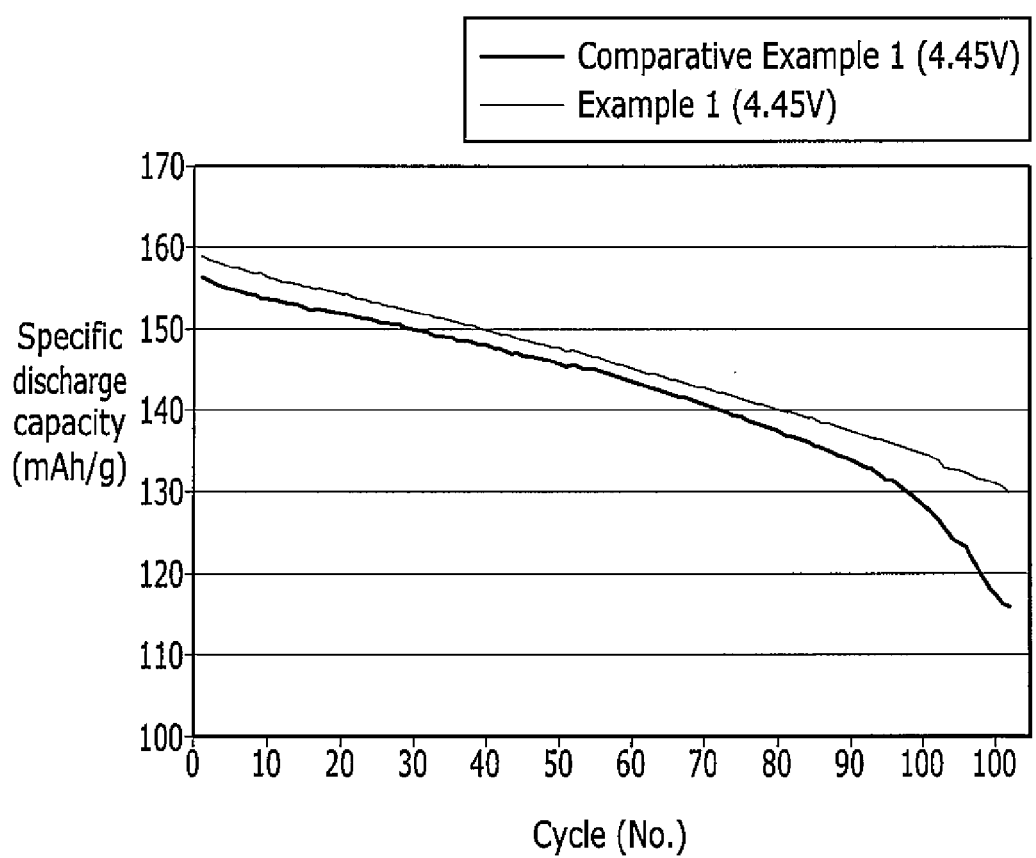
Figure 4:
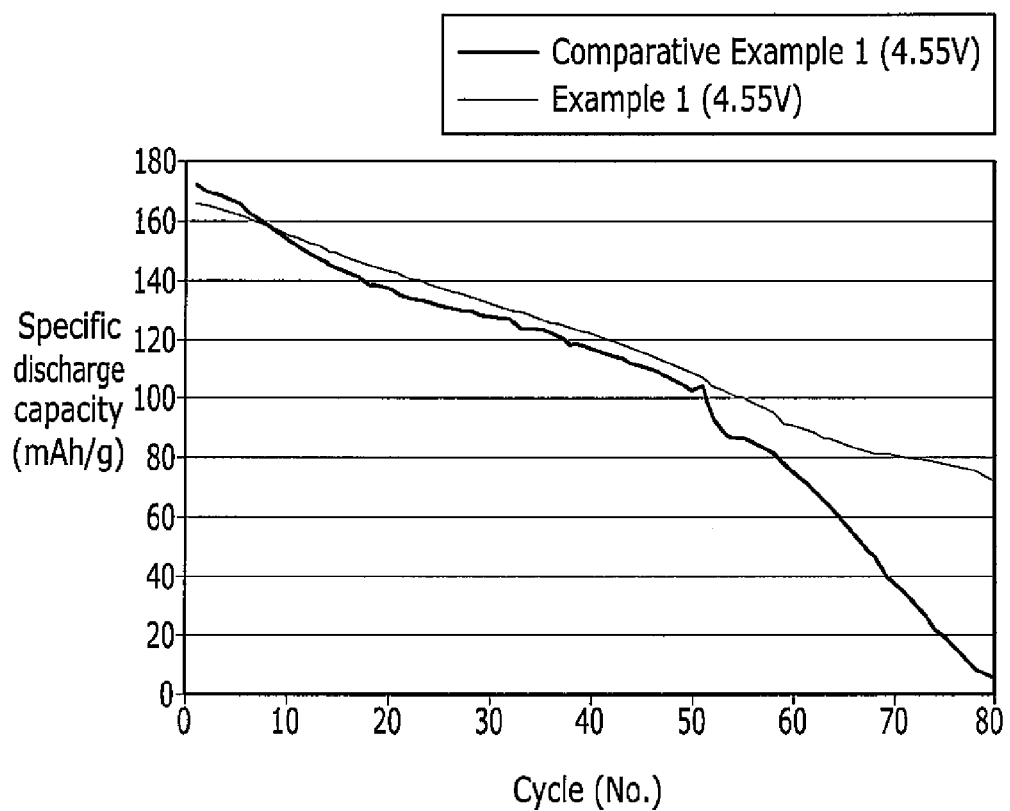

The measurement results at each voltage are provided in FIGS. 2, 3, and 4.

Referring to FIGS. 2 to 4, the rechargeable lithium battery cell according to Example 1 had improved cycle-life characteristic compared with that according to Comparative Example 1. In addition, the rechargeable lithium battery cell had much higher effects as the voltage increased.

Evaluation Example 2: Cycle-Life Characteristic of Rechargeable Lithium Battery Cell (2)

The rechargeable lithium battery cells according to Example 2 and Comparative Example 2 were measured regarding specific discharge capacity change with repeated cycles and then, capacity retention relative to capacity at the first cycle was calculated. The results are provided in FIG. 5 (charge: 0.5 C, discharge: 0.5 C, temperature: 45° C.).

Figure 5:
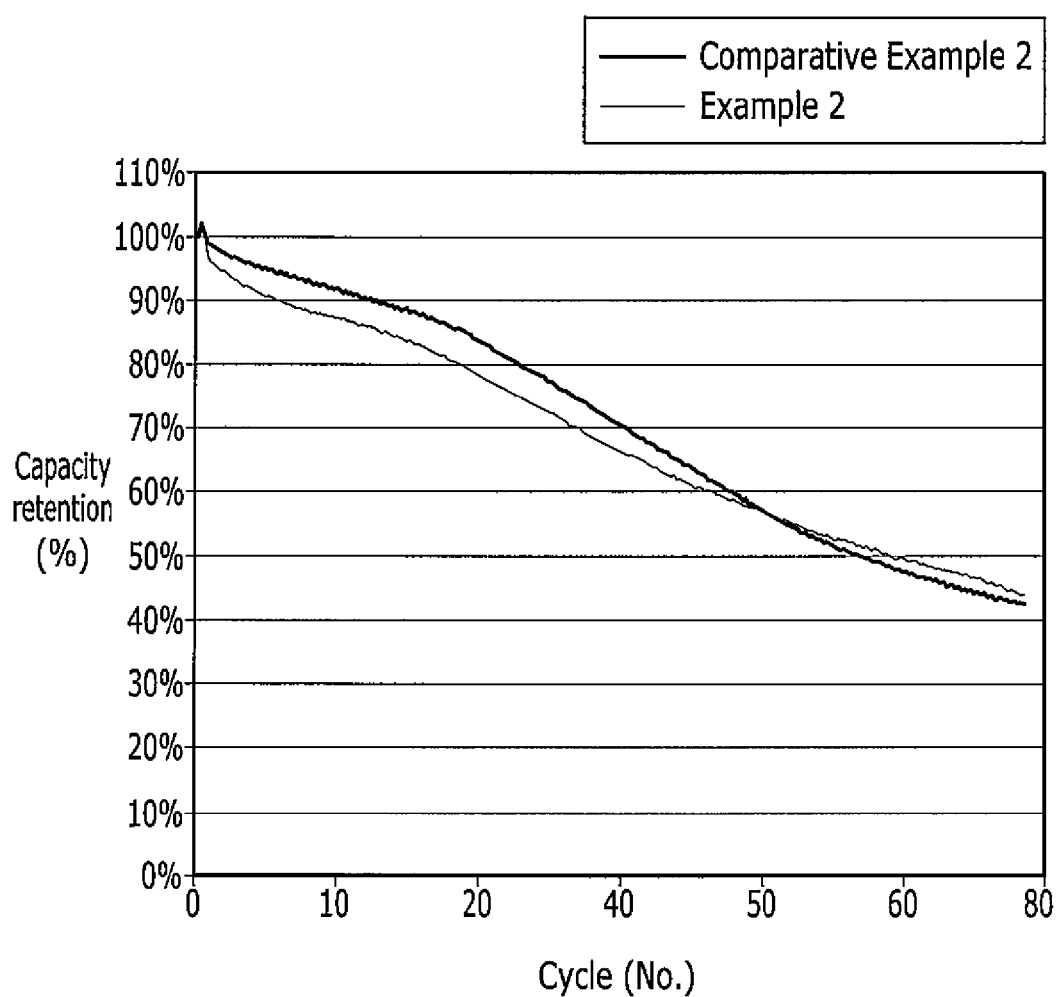
FIG. 5 is a graph showing cycle-life characteristics of rechargeable lithium battery cells according to Example 2 and Comparative Example 2.

Referring to FIG. 5, the rechargeable lithium battery cell according to Example 2 had initial performance deterioration but improved cycle-life characteristic from about the $200^{th}$ cycle as the cycles were increased, compared with the one according to Comparative Example 2.

Evaluation Example 3: Thermal Stability Evaluation

The rechargeable lithium battery cells according to Example 3 and Comparative Examples 3 and 4 were tested three times regarding thermal shock. The rechargeable lithium battery cells were stored at 85° C. for 1 hour and at −40° C. for 1 hour, which were repeated 30 times in total, and then, measured regarding battery thickness change. The results are provided in FIG. 6.

Figure 6:
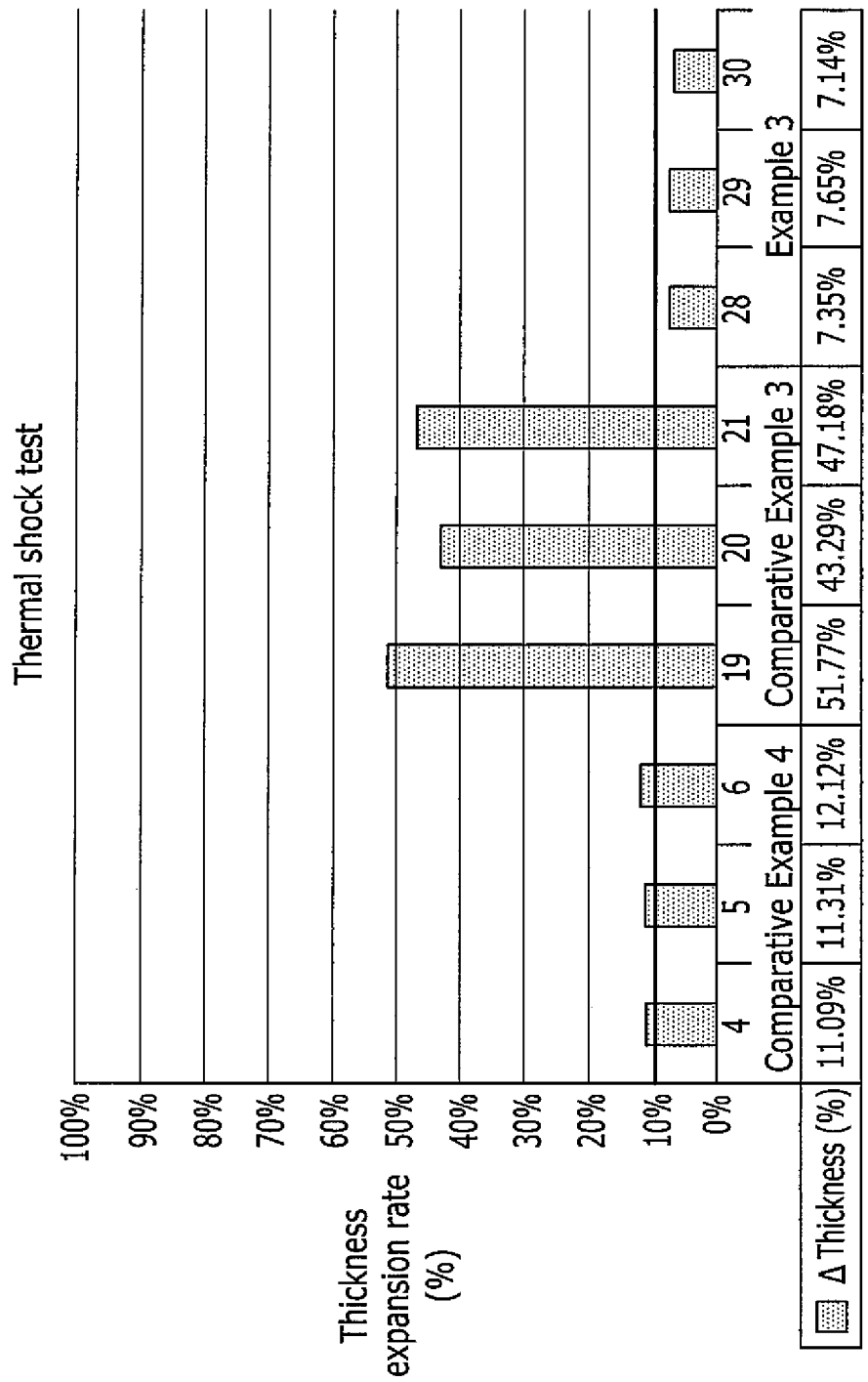
FIG. 6 is a graph showing thermal shock test results of rechargeable lithium battery cells according to Example 3 and Comparative Examples 3 and 4.

Referring to FIG. 6, the rechargeable lithium battery cell according to Comparative Example 3 had a thickness expansion rate of greater than or equal to 43%, and the rechargeable lithium battery cell according to Comparative Example 4 had a thickness expansion rate of greater than 11%. On the other hand, the rechargeable lithium battery cell according to Example 3 had a thickness expansion rate ranging from 7.14% to 7.65% and thus, excellent thermal stability.

Evaluation Example 4: Redox Characteristic Depending on a Number of Nitrile Groups The compound represented by Chemical Formula 1 had three nitrile groups and more effectively improved stability of a positive electrode than one having one or two nitrile groups.

In order to explain this result, X-ray photoelectron spectroscopy was performed on the surface of the positive electrodes of the rechargeable lithium battery cells according to Example 4 and Comparative Examples 5 and 6, and a nitrogen (N) peak change thereon was examined. The result is provided in Table 2. In Table 2, the N peak (additive μmol) is obtained by dividing the N peak results using additive 1 part by weight by mmols of the used additive. For example, in Example 4, 1 part by weight of the used additive corresponded to 3.888 mmols so that the N peak (additive 1 mmol) of 1.389 was obtained by dividing 5.401 by 3.888.

TABLE 2

| | Example 4 | Comparative Example 5 | Comparative Example 6 |
|---|---|---|---|
| Additive structure | 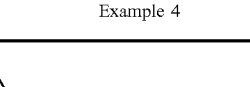 | 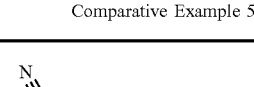 |  |

TABLE 2-continued

|  | Example 4 | Comparative Example 5 | Comparative Example 6 |
|---|---|---|---|
| Number of nitrile group | 3 | 2 | 1 |
| N peak (additive 1 mmol) | 1.389 | 1.100 | 0.637 |
| N peak (additive 1 part by weight) | 5.401 | 4.740 | 3.075 |

Generally, the positive electrodes have a higher nitrogen peak due to a nitrile group in the XPS evaluation, as the electrolyte additives had more coordination bonds in the positive electrodes. Referring to Table 2, when the electrolyte additives were added in an amount of 1 mmol or 1 g, the positive electrode according to Example 4 had a higher nitrogen peak than those according to Comparative Examples 5 and 6. In other words, the electrolyte additive having three nitrile groups had more coordination bonds than the additive having one or two nitrile groups in the positive electrode and thus, in these examples, further stabilized the positive electrode.

Evaluation Example 5: Oxidation/Reduction Stability Depending on a Number of Carbons in a Chain Between the Oxygen Group and the Nitrile Group In these examples, the compound represented by Chemical Formula 1 had an ethylene group having two carbons or a propylene group having three carbons in a chain between the oxygen (—O—) and the nitrile (—CN) group and had a suitable molecular weight and thus, was not oxidized in an electrolyte for a rechargeable lithium battery cell and simultaneously had high reduction stability.

Figure 7:
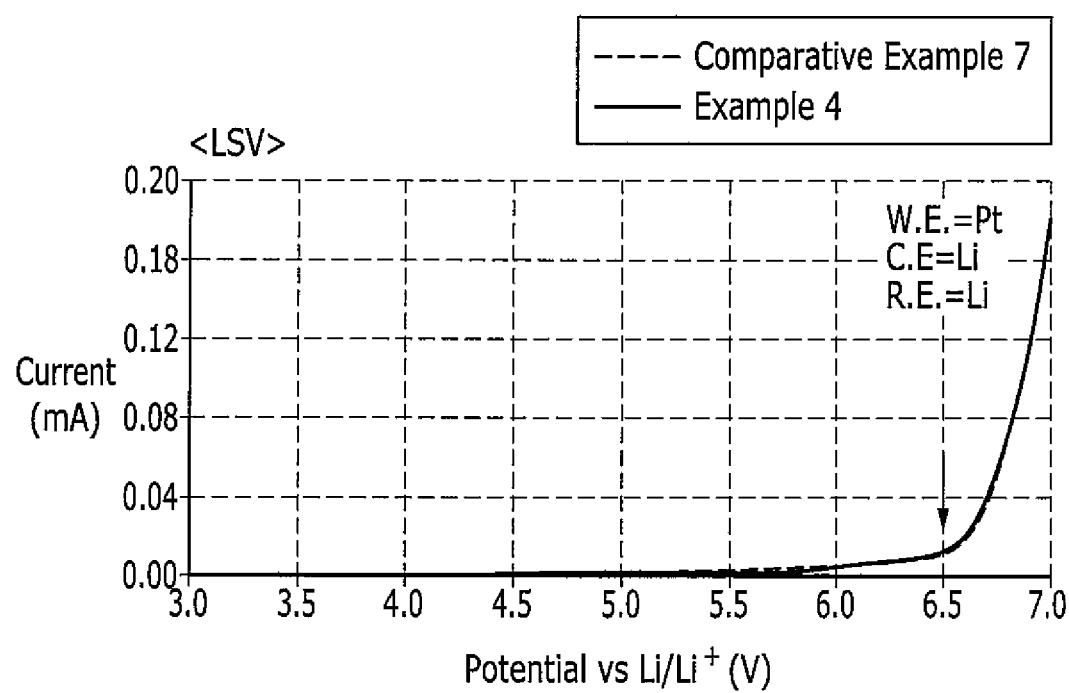
FIG. 7 is a graph showing a linear sweep voltammetry (LSV) analysis of rechargeable lithium battery cells according to Example 4 and Comparative Example 7.
Figure 8:
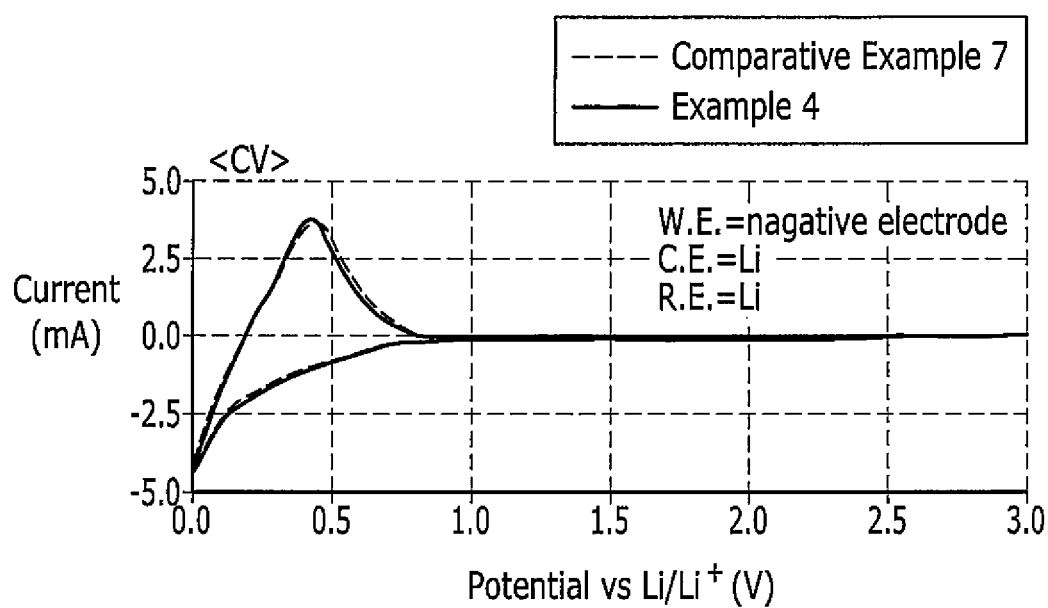
FIG. 8 is a graph showing a cyclic voltammetry (CV) analysis of the rechargeable lithium battery cells according to Example 4 and Comparative Example 7.

In order to explain this result, the rechargeable lithium battery cell according to Example 4 and the rechargeable lithium battery cell including no electrolyte additive according to Comparative Example 7 were evaluated regarding electrochemical characteristics. FIG. 7 provides a linear sweep voltammetry (LSV) graph showing current analysis by increasing a voltage from 3V to 7V. The linear sweep voltammetry (LSV) graph shown in FIG. 7 was obtained by using Pt as a working electrode, Li as a counter electrode, and Li as a reference electrode. In addition, FIG. 8 provides a cyclic voltammetry (CV) curved line showing current analysis by decreasing a voltage from 3V to 0V. The cyclic voltammetry (CV) curved line shown in FIG. 8 was obtained by using each electrode according to Example 4 and Comparative Example 7 as a working electrode, Li as a counter electrode, and Li as a reference electrode.

Furthermore, the following Table 3 shows molecular weight, HOMO (highest occupied molecular orbital) energy, and LUMO (lowest occupied molecular orbital) energy, of a compound represented by Chemical Formula 1-1 (having two carbons) and a compound represented by Chemical Formula 1-2 (having three carbons) as Examples, and a compound represented by Chemical Formula 3-1 (having one carbon) and a compound represented by Chemical Formula 3-2 (having four carbons) as Comparative Examples.

TABLE 3

|  | Comparative Example 8 [Chemical Formula 3-1] | Example 4 [Chemical Formula 1-1] | [Chemical Formula 1-2] | Comparative Example 9 [Chemical Formula 3-2] |
|---|---|---|---|---|
| Structure | (structure) | (structure) | (structure) | (structure) |
| Carbon number | 1 | 2 | 3 | 4 |
| Molecular weight | 215.01 | 257.06 | 299.10 | 341.15 |
| HOMO | −14.355 | −13.823 | −13.614 | −13.209 |
| ΔHOMO | — | 0.532 | 0.209 | 0.405 |
| LUMO | −6.272 | −5.782 | −5.656 | −5.437 |
| ΔLUMO | — | 0.490 | 0.126 | 0.219 |

In general, when a compound has higher HOMO, the compound is more easily oxidized and has a lower oxidation stability, while when a compound has lower LUMO, the compound is more easily reduced and has a lower reduction stability. Referring to Table 3, as the number of carbon increased in a chain between oxygen and a nitrile group, a compound had higher HOMO and LUMO and thus, was more easily oxidized but less easily reduced.

However, referring to FIG. 7, the compound having two carbons and represented by Chemical Formula 1-1 according to Example 4 had no measurable voltage decomposition at an operation voltage. In addition, referring to FIG. 8, the compound according to Example 4 had no measurable reduction decomposition at an operation voltage.

Accordingly, the compound having two carbons and represented by Chemical Formula 1-1 was not oxidized and simultaneously had higher reduction stability than that having one carbon and represented by Chemical Formula 3-1.

Chemical Formula 1-2 including three carbons had lower oxidation stability than Chemical Formula 1-1 including two carbons but a small change and accordingly, was not oxidized and had high reduction stability.

On the other hand, Chemical Formula 3-1 including one carbon had deteriorated reduction stability. In addition, Chemical Formula 3-2 including four carbons had a large HOMO change and thus, low oxidation stability and considerably increased molecular weight. Accordingly, a molar amount relative to a mass is decreased, thereby deteriorating performance improvement relative to the mass.

Therefore, a compound having two or three carbons had a molecular weight within an suitable range and simultaneously, high oxidation stability and reduction stability.

Evaluation Example 6: Cycle-Life Characteristic Comparison with Borate Additive

The rechargeable lithium battery cells using Chemical Formula 1-1 as an electrolyte additive according to Example 4 and that using succinonitrile instead of Chemical Formula 1-1 according to Comparative Example 10, and that using B-base instead of Chemical Formula 1-1 according to Comparative Example 11 were measured regarding capacity retention, as a cycle was increased. The results are provided in FIG. 9.

Figure 9:
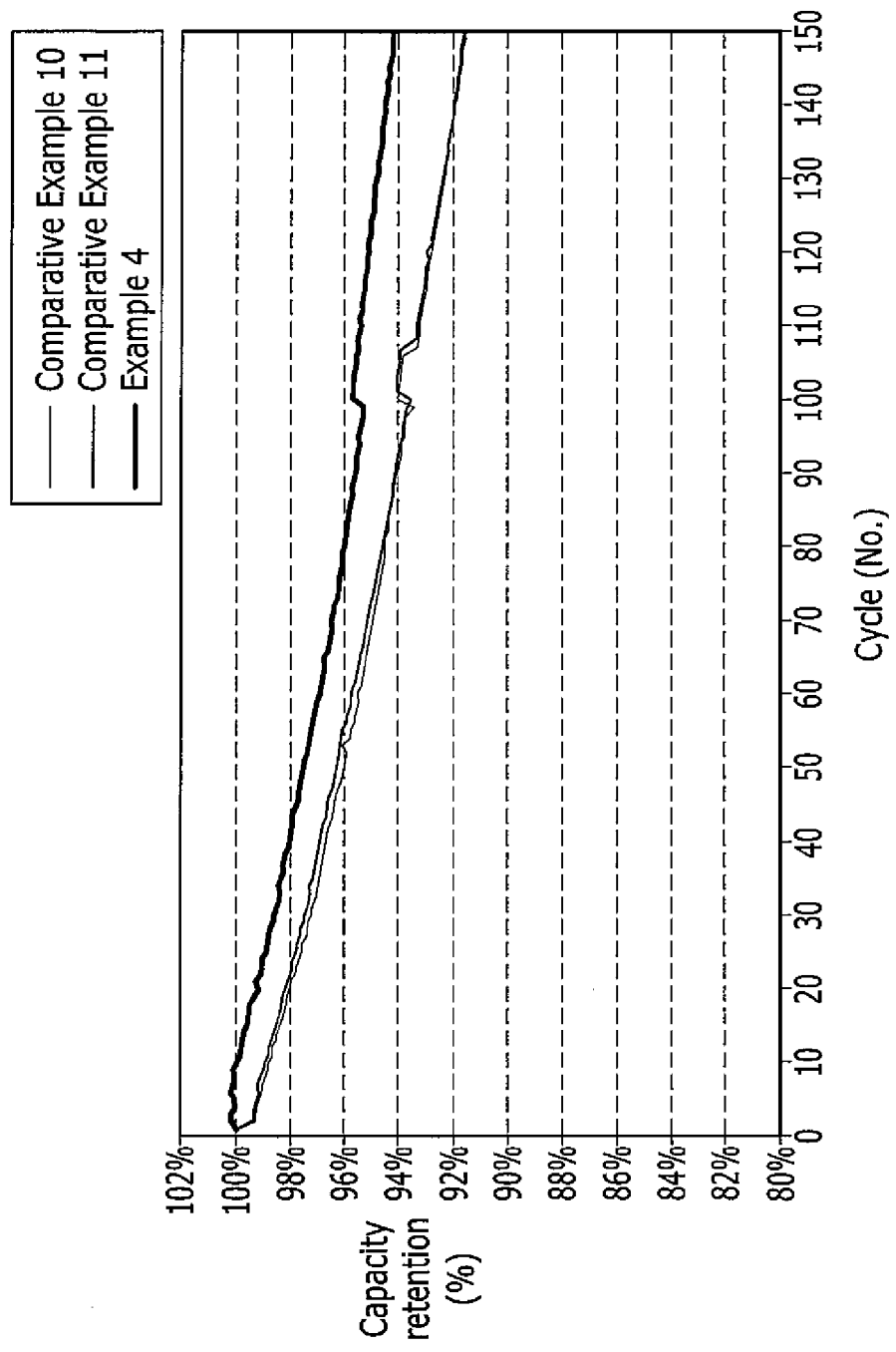
FIG. 9 is a graph showing cycle-life characteristics of rechargeable lithium battery cells according to Example 4 and Comparative Examples 8 and 9.

Referring to FIG. 9, the rechargeable lithium battery cells according to Comparative Examples 10 and 11 had similar capacity retentions, but the rechargeable lithium battery cell according to Example 4 had a higher capacity retention than Comparative Examples 10 and 11.

In other words, the rechargeable lithium battery cell using the compound represented by Chemical Formula 1 according to one embodiment of the present invention had markedly improved battery characteristics compared with the one using a borate-based compound represented by Chemical Formula 4-1 as an electrolyte additive.

While this invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof. Therefore, the aforementioned embodiments should be understood as not limiting the present invention in any way.

What is claimed is:

1. An electrolyte for a rechargeable lithium battery, comprising
a lithium salt, a non-aqueous organic solvent, and an additive, the additive comprising a compound represented by the following Chemical Formula 1:

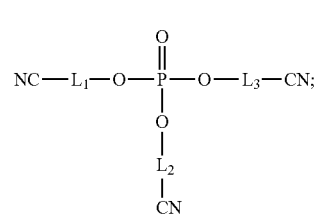

[Chemical Formula 1]

wherein,
$L_1$ to $L_3$ are each independently selected from a substituted or unsubstituted ethylene group and a substituted or unsubstituted propylene group.

2. The electrolyte of claim 1, wherein the compound represented by Chemical Formula 1 is a compound represented by the following Chemical Formula 1-1 or a compound represented by the following Chemical Formula 1-2:

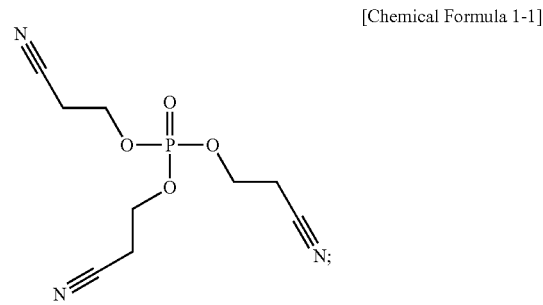

[Chemical Formula 1-1]

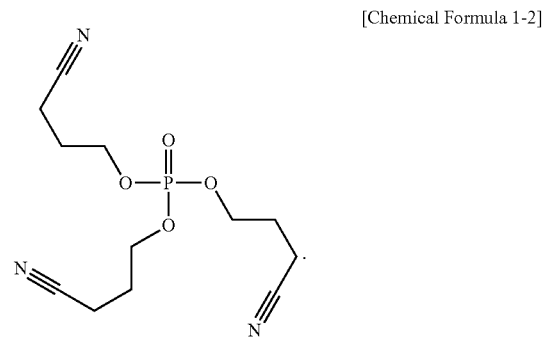

[Chemical Formula 1-2]

3. The electrolyte of claim 1, wherein the compound represented by Chemical Formula 1 is included in an amount of about 0.1 parts by weight to about 5 parts by weight based on 100 parts by weight of the non-aqueous organic solvent.

4. The electrolyte of claim 1, wherein the additive further comprises a cyclic sultone derivative.

5. The electrolyte of claim 4, wherein the cyclic sultone derivative is selected from 1,3-propanesultone (PS), 1-methyl-1,3-propanesultone, 2-methyl-1,3-propanesultone, 3-methyl-1,3-propanesultone, 1-ethyl-1,3-propanesultone, 2-ethyl-1,3-propanesultone, 3-ethyl-1,3-propanesultone, 1,2-dimethyl-1,3-propanesultone, 1,3-dimethyl-1,3-propanesultone, 2,3-dimethyl-1,3-propanesultone, 1-methyl-2-ethyl-1,3-propanesultone, 1-methyl-3-ethyl-1,3-propanesultone, 2-methyl-3-ethyl-1,3-propanesultone, 1-ethyl-2-methyl-1,3-propanesultone, 1-ethyl-3-methyl-1,3-propanesultone, 2-ethyl-3-methyl-1,3-propanesultone, 1-fluoromethyl-1,3-propanesultone, 2-fluoromethyl-1,3-propanesultone, 3-fluoromethyl-1,3-propanesultone, 1-trifluoromethyl-1,3-propanesultone, 2-trifluoromethyl-1,3-propanesultone, 3-trifluoromethyl-1,3-propanesultone, 1-fluoro-1,3-propanesultone, 2-fluoro-1,3-propanesultone, 3-fluoro-1,3-propanesultone, 1,2-difluoro-1,3-propanesultone, 1,3-difluoro-1,3-propanesultone, and 2,3-difluoro-1,3-propanesultone.

6. The electrolyte of claim 4, wherein the cyclic sultone derivative is 1,3-propanesultone (PS).

7. The electrolyte of claim 4, wherein the cyclic sultone derivative is included in an amount of about 0.1 parts to about 5 parts by weight based on 100 parts by weight of the non-aqueous organic solvent.

8. The electrolyte of claim 1, wherein the additive further comprises an aliphatic dinitrile compound.

9. The electrolyte of claim 8, wherein the aliphatic dinitrile compound is a C1 to C12 linear or branched dinitrile compound.

10. The electrolyte of claim 8, wherein the aliphatic dinitrile compound is selected from succinonitrile, sebaconitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 2,5-dimethyl-2,5-hexane dicarbonitrile, 2,6-dicyanoheptane, 2,7-dicyanooctane, 2,8-dicyanononane, and 1,6-dicyanodecane.

11. The electrolyte of claim 8, wherein the aliphatic dinitrile compound is included in an amount of about 0.1 parts to about 5 parts by weight based on 100 parts by weight of the non-aqueous organic solvent.

12. A rechargeable lithium battery comprising
a positive electrode,
a negative electrode, and
an electrolyte comprising
a lithium salt, a non-aqueous organic solvent, and an additive, the additive comprising a compound represented by the following Chemical Formula 1:

[Chemical Formula 1]

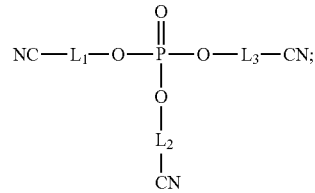

wherein,
$L_1$ to $L_3$ are each independently selected from a substituted or unsubstituted ethylene group and a substituted or unsubstituted propylene group.

13. The rechargeable lithium battery of claim 12, wherein the compound represented by Chemical Formula 1 is included in an amount of about 0.1 parts by weight to about 5 parts by weight based on 100 parts by weight of the non-aqueous organic solvent.

14. The rechargeable lithium battery of claim 12, wherein the additive further comprises a cyclic sultone derivative.

15. The rechargeable lithium battery of claim 14, wherein the cyclic sultone derivative is included in an amount of about 0.1 parts to about 5 parts by weight based on 100 parts by weight of the non-aqueous organic solvent.

16. The rechargeable lithium battery of claim 12, wherein the additive further comprises an aliphatic dinitrile compound.

17. The rechargeable lithium battery of claim 16, wherein the aliphatic dinitrile compound is included in an amount of about 0.1 parts to about 5 parts by weight based on 100 parts by weight of the non-aqueous organic solvent.

* * * * *